(12) United States Patent
Agrawalla et al.

(10) Patent No.: US 11,803,353 B2
(45) Date of Patent: Oct. 31, 2023

(54) SCREEN FOCUS AREA AND VOICE-OVER SYNCHRONIZATION FOR ACCESSIBILITY

(71) Applicant: PayPal, Inc., San Jose, CA (US)

(72) Inventors: Trupti Agrawalla, Bangalore (IN); Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 244 days.

(21) Appl. No.: 17/021,766

(22) Filed: Sep. 15, 2020

(65) Prior Publication Data
US 2022/0083311 A1    Mar. 17, 2022

(51) Int. Cl.
*G06F 3/16*    (2006.01)
*G06F 3/04812*    (2022.01)
*H04M 3/42*    (2006.01)

(52) U.S. Cl.
CPC .......... *G06F 3/167* (2013.01); *G06F 3/04812* (2013.01); *H04M 3/42391* (2013.01)

(58) Field of Classification Search
CPC . G06F 3/167; G06F 3/04812; H04M 3/42391
See application file for complete search history.

(56) References Cited

U.S. PATENT DOCUMENTS

| 2007/0038923 | A1* | 2/2007 | Patel | G06F 3/167 715/202 |
| 2007/0176944 | A1* | 8/2007 | Brown | G06F 3/0481 345/592 |
| 2007/0211071 | A1* | 9/2007 | Slotznick | G06F 16/957 345/594 |
| 2014/0058733 | A1* | 2/2014 | Voorhees | G09B 21/005 704/260 |

* cited by examiner

*Primary Examiner* — Tan H Tran
(74) *Attorney, Agent, or Firm* — Haynes and Boone, LLP

(57) ABSTRACT

Systems and methods for synchronizing screen highlights and voice-over are disclosed. A system obtains a text container queued to be audibly read by a screen reader where the text container includes plain text and hyperlinks. The system determines each accessibility element in the text container, where each of the accessibility elements has one or more old accessibility frames associated with a screen highlight of a plain text or a hyperlink of the accessibility element, and where the screen highlight indicates what is being audibly read by the screen reader. For each of the accessibility elements, the system: determines one or more frames that captures the plain text or the hyperlink of the accessibility element to an exclusion of a plain text or a hyperlink corresponding to another accessibility element; converts the frames into a new accessibility frame; and replaces the old accessibility frame with the new accessibility frame.

20 Claims, 21 Drawing Sheets

SCREEN FOCUS AREA AND VOICE-OVER SYNCHRONIZATION FOR ACCESSIBILITY

TECHNICAL FIELD

The present disclosure generally relates to digital content accessibility and more particularly to focus area and voice-over synchronization for vision accessibility technology according to various embodiments.

BACKGROUND

Accessibility focuses on the use of assistive technology in the design of products, devices, services, and system environments so as to facilitate use by people who have trouble accessing content, such in low-light environments, in moving environments where motions of a mobile device may make content hard to read, temporary or permanent vision issues, and the like. For example, assistive technologies are made available to support users who are blind or have low vision. A voice-over feature of a device may provide auditory descriptions of onscreen elements to assist a blind or low-vision user navigate screens. However, oftentimes, it may be challenging for a low-vision user to identify the text that is read aloud when using the voice-over feature such as when the text includes clickable hyperlinks and the voice-over feature has instructions to click a hyperlink. Further, it may be challenging for a low-vision user to identify which text is the correct hyperlink to click if there are multiple hyperlinks that have been highlighted on a screen and/or read aloud. Thus, there is a need in the art for an improved accessibility user interface, which can simplify the user experience for the user by synchronizing focus areas on a screen with voice-over features.

Figure 1A:
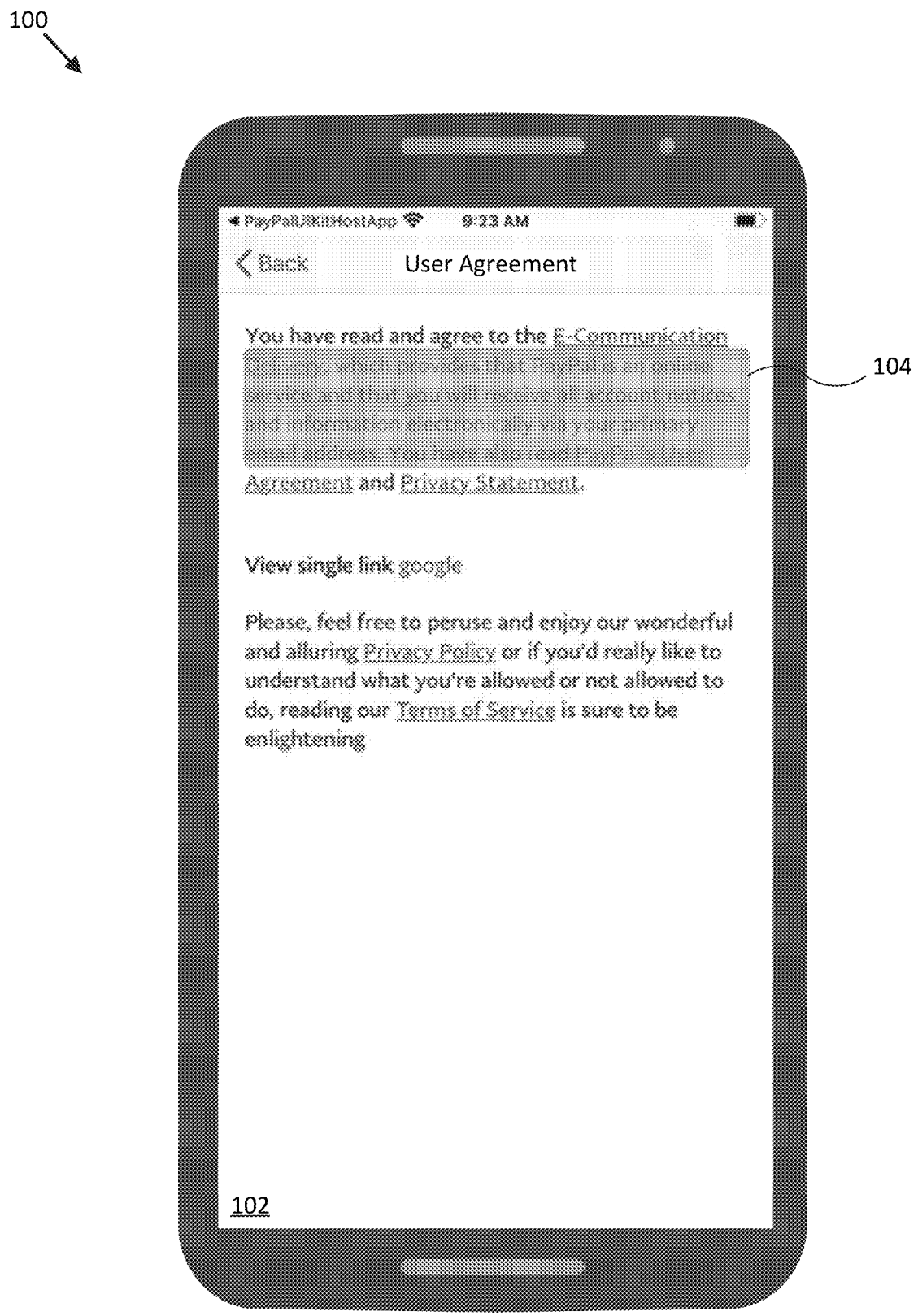
FIGS. 1A-1C illustrate technical problems with prior systems and methods where there is asynchronization between screen highlights and voice-over.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Technology is used for most of the activities people do every day such as communicating with others, finding information, publishing and reading, watching videos, listening to music, selling and buying goods and services, going to school, and so forth. Technology should be designed so that content can be accessed or viewed by as many people as possible in as many different situations or environments as possible so that more people can engage in such activities. Accessibility focuses on the use of assistive technology in the design of products, devices, services, and system environments so as to facilitate wider accessibility.

For instance, assistive technologies are made available to support users who are blind or have low vision. An example of an assistive technology is a voice-over feature of a screen reader application, which may provide auditory descriptions and/or instructions for onscreen elements of a device. However, prior systems and methods have made certain scenarios challenging and confusing for low-vision users, such as when text in a focus area (e.g., screen highlight, magnified text) that is read aloud using the voice-over feature includes both clickable text (e.g., clickable hyperlinks) and non-clickable text (e.g., plain text). FIG. 1A illustrates the aforementioned technical problem with a user interface 102 of a user device 100. As shown in FIG. 1A, screen highlight 104 may provide an indication of what is currently being read by a screen reader application of the user device 100. However, the screen highlight 104 is over-inclusive in that there are portions of the screen highlight 104 that are not read by the screen reader application, which is only reading the plain text: "which provides that PayPal is an online service and that you will receive all account notices and information electronically via your primary email address. You have also read", and not the clickable hyperlinks, "Delivery" and "PayPal's User" in the screen highlight 104.

The over-inclusion of the clickable hyperlinks in the screen highlight 104 when only the plain text is read may be a result of the prior system and methods' limited ability to synchronize the screen highlight 104 and the voice-over audibly read by the screen reader application.

The asynchronous characteristics of the prior systems and methods may make it challenging and confusing for a user to identify which text is actually being read aloud. For example, a user may incorrectly believe that the hyperlinks included in the screen highlight 104 were part of the text that was read aloud.

Figure 1B:
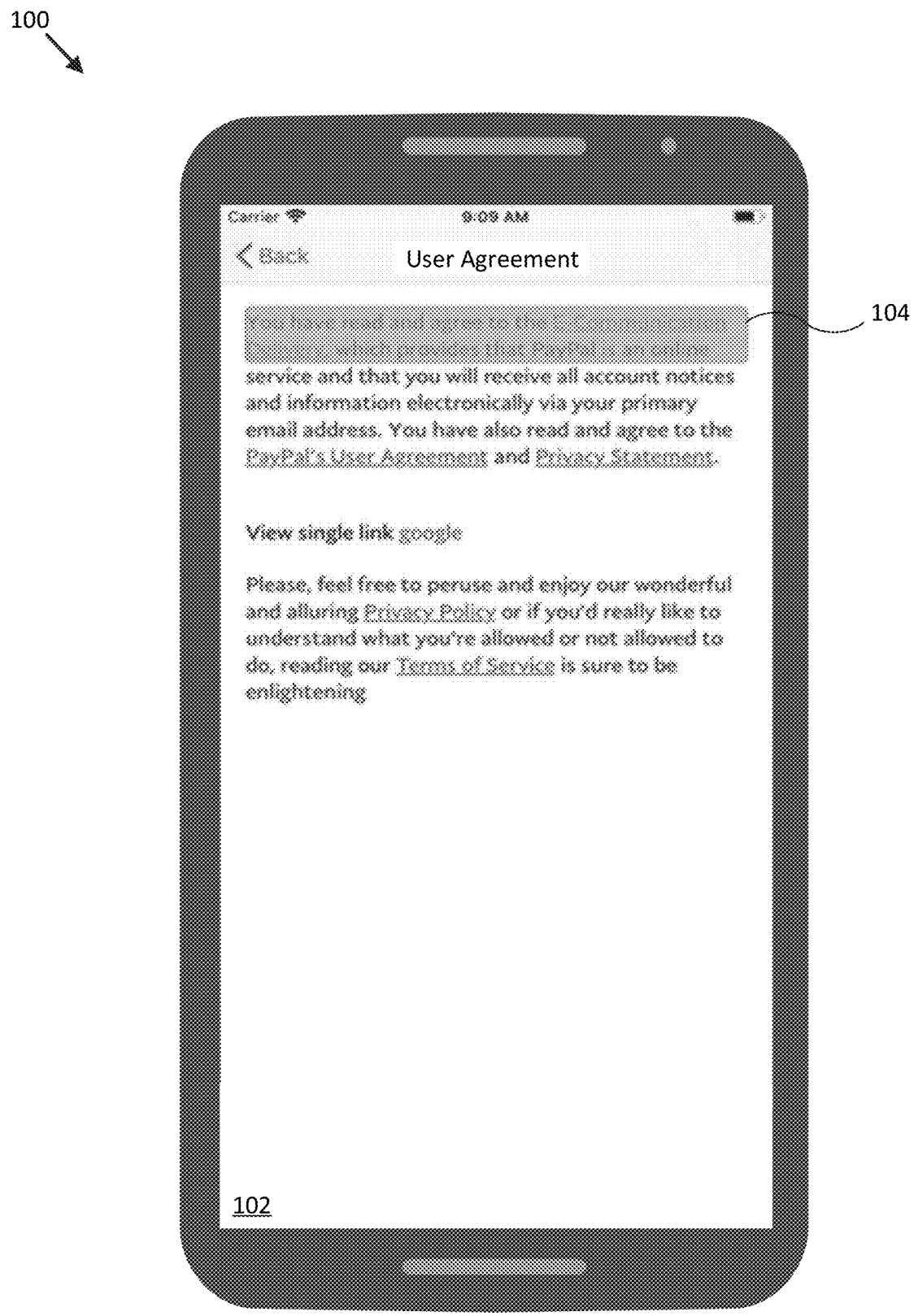

FIG. 1B illustrates another technical problem with the asynchronization of voice-over and screen highlight 104 in prior systems and methods. As shown in FIG. 1B, a voice-over may read and provide user instructions for the clickable hyperlink "E-communication Delivery," however the screen highlight 104 over-includes the plain text of "You have read and agree to the" and ", which provides that PayPal is an online." Thus, when the screen reader application instructs the user to click on the hyperlink in the screen highlight 104, a user may have trouble clicking the appropriate text that is a hyperlink and may be confused as to why nothing is happening when he/she is clicking/tapping the plain text in the screen highlight 104. In other words, the user may be tapping within the screen highlight 104, but confused as to why the plain text that was over-included in the screen highlight 104 is not redirecting him/her to another screen.

Figure 1C:
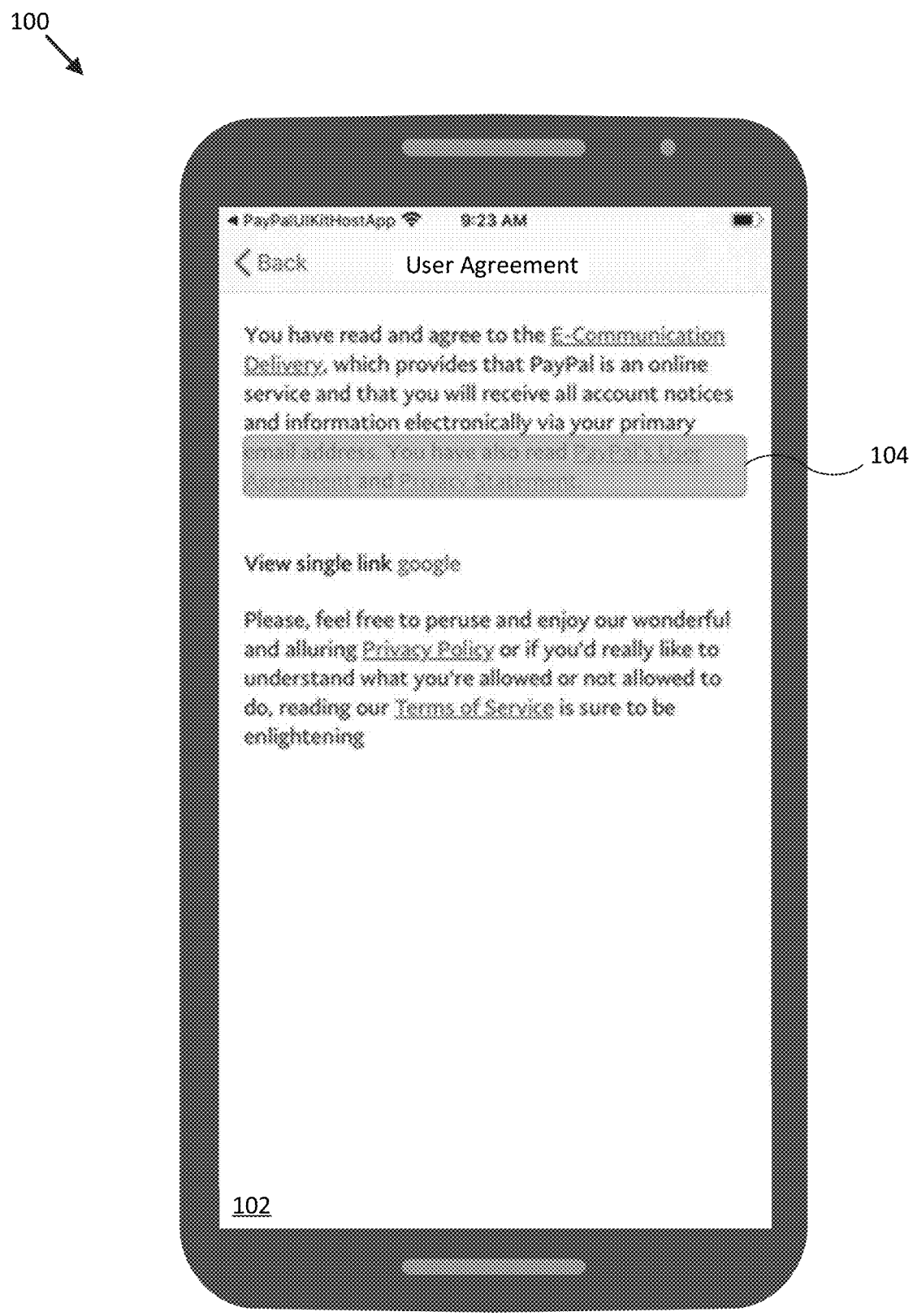

FIG. 1C illustrates yet another example of the technical problem with the asynchronization of voice-over and screen highlight 104 in prior systems and methods. As shown in FIG. 1C, a voice-over may audibly read and provide instructions for the clickable hyperlink "PayPal's User Agreement," however the screen highlight 104 may over-include the plain text of "email address. You have also read" and "and" as well as the clickable hyperlink "Privacy Statement." As such, there is plain text and another clickable hyperlink in the screen highlight 104 that may confuse the user. For example, when the screen reader application instructs the user to click on the hyperlink "PayPal's User Agreement" in the screen highlight 104, the user may have trouble clicking the appropriate text that is a hyperlink and may be confused as to why nothing is happening when he/she is clicking the plain text in the screen highlight 104 believing that it is the hyperlink or the user may accidentally click the wrong hyperlink of "Privacy Statement" and be directed to a wrong screen.

Thus, there exists a need in the art to improve accessibility technology and provide a simplified user interface for the user by synchronizing screen highlights (or focus areas) on a screen with voice-over features of a screen reader application. The present disclosure describes systems and methods for improving accessibility user interfaces in accessibility technology by synchronizing screen highlights and voice-overs for screen reader applications such that onscreen elements that are audibly described by the screen reader application is accurately highlighted or otherwise focused on the screen to guide the user in navigating the user interface.

Figure 2A:
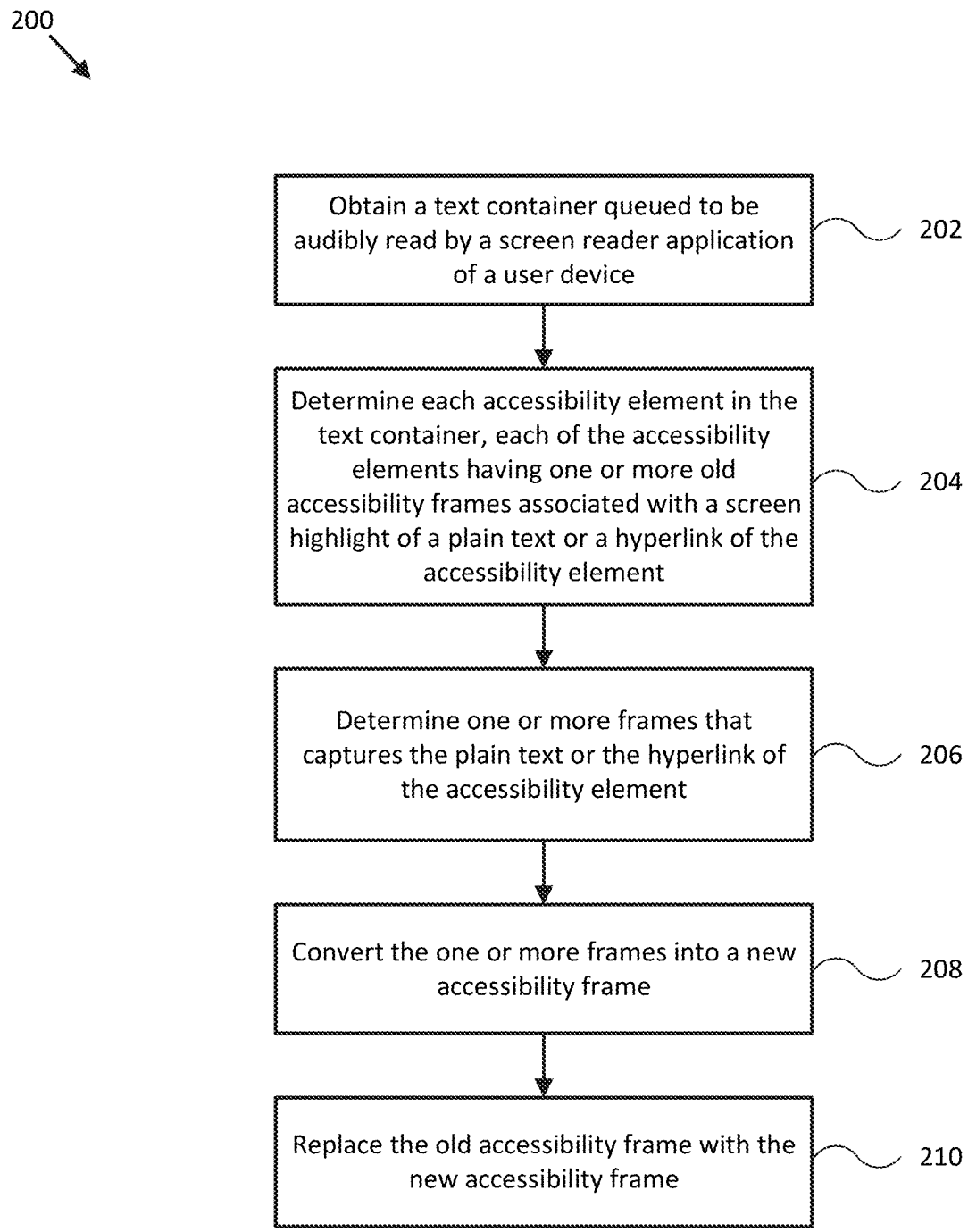
FIG. 2A illustrates a flow diagram of a process for synchronizing screen highlights and voice-over for screen reader applications in accordance with one or more embodiments of the present disclosure.

Referring now to FIG. 2A, illustrated is a flow diagram of a process 200 for synchronizing screen highlights and voice-over for screen reader applications in accordance with one or more embodiments of the present disclosure. For explanatory purposes, process 200 is primarily described herein with reference to FIGS. 2B-2J; however, process 200 is not limited to FIGS. 2B-2J and may generally be implemented in view of the additional figures of the present disclosure. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed.

Figure 2B:
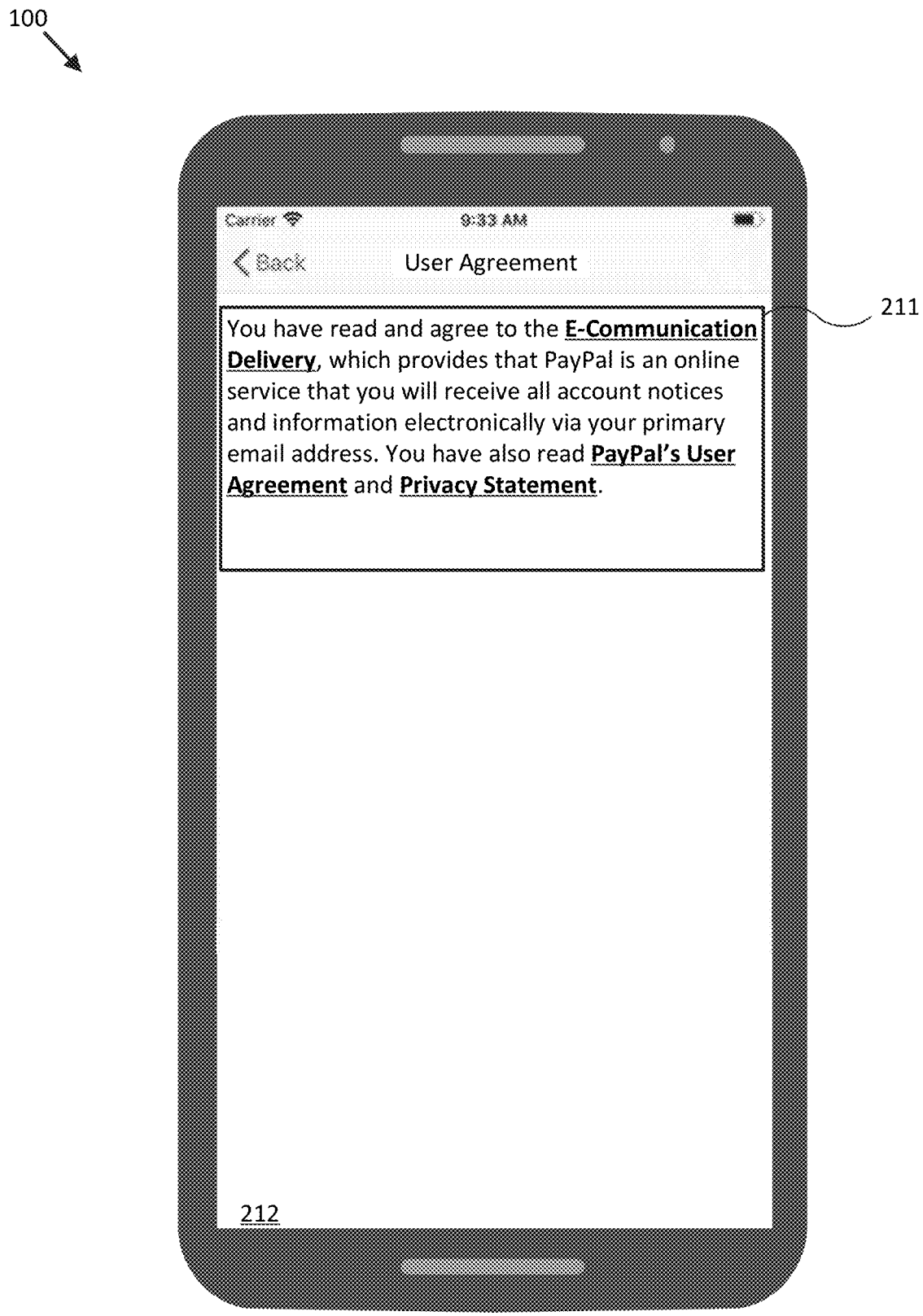
FIG. 2B illustrates a text container on a screen of a device where the text is to be read aloud by a screen reader application in accordance with one or more embodiments of the present disclosure.

At block 202, a system may obtain a text container 211 queued to be audibly read by a screen reader application of a user device 100. In some embodiments, the screen reader application may be part of an accessibility feature integrated into an operating system of the user device 100. In one case, the screen reader application may be VoiceOver integrated into iOS™, macOS™, tvOS™, or watchOS™ on an Apple™ device. As shown in FIG. 2B, the text container 211 may contain plain text and/or clickable hyperlinks or other redirecting links. "E-Communication Delivery," "PayPal's User Agreement," and "Privacy Statement" are bolded and underlined to depict clickable hyperlinks in the text container 211 and FIGS. 2A-2J whereas the remaining text of the text container 211 is non-clickable plain text.

Referring back to FIG. 2A, at block 204, the system may determine each accessibility element in the text container 211. For example, the system may communicate with the screen reader application to acquire each accessibility element from the screen reader application. An accessibility element may be an onscreen element that has specific types of properties. In some embodiments, when a screen reader application is enabled on a device, the screen reader application may take as input the accessibility elements and provide audible descriptions/instructions for each accessibility element as well as highlight portions of the screen associated with the accessibility element to assist a user in understanding and navigating the screens of the device. The screen reader application may provide the audible descriptions/instructions for each accessibility element as well as highlight portions of the screen associated with the accessibility element based on the properties of the accessibility element.

In one embodiment, the specific types of properties of the accessibility element may include one or more old accessibility frames (e.g., content frames) that direct the screen reader application to highlight a portion of the screen associated with the content of the accessibility element. For example, the highlight may be over plain text when the screen reader application reads the plain text or the highlight may be over a hyperlink when the screen reader application reads and provides instructions for the hyperlink. A screen highlight may visually indicate to a user what is being audibly read by the screen reader application or direct a user to a certain portion of the screen to interact. The old accessibility frames of prior systems and methods typically have technical problems with synchronization of screen highlights and voice-over, and as such, are replaced with new accessibility frames according to various embodiments of the present disclosure to solve such technical problems.

In some embodiments, an accessibility element may have additional properties such as whether the text is a hyperlink (e.g., .link) or plain text (e.g., .staticText). The screen reader application may perform different actions based on the trait of the text. For example, where an accessibility element is a hyperlink, the screen reader application may read aloud the hyperlink along with instructions for how to activate (e.g., click, tap) the hyperlink and what happens when the hyperlink is activated. On the other hand, where an accessibility element is plain text, the screen reader application may simply read the plain text aloud. In some embodiments, the screen reader application provides additional audible instructions following each accessibility element to inquire whether the user would like to move forward or backward between accessibility elements.

Referring to FIGS. 2C-2H, accessibility elements 213a, 215a, 217a, 219a, 221a, and 223a on a graphical user interface (GUI) of user device 100 are shown in dotted lines. As discussed above, a screen reader application may audibly read the text of each accessibility element. A user may sequentially move between the accessibility elements by interacting with the screen 212 of the device 100 or inputting audible instructions to the device 100 according to various embodiments.

The old accessibility frames 213b, 215b, 217b, 219b, 221b, and 223b corresponding to the accessibility elements 213a, 215a, 217a, 219a, 221a, and 223a illustrate what is highlighted on the screen for the user as each of the accessibility elements are read by the screen reader application. However, as shown in FIGS. 2D, 2E, and 2F, the old accessibility frames 215b, 217b, and 219b are not synchronized with the text of their corresponding accessibility elements 215a, 217a, and 219a. In other words, the screen highlighting of the text read aloud by the screen reader application for accessibility elements 215a, 217a, and 219a over-includes additional text from other accessibility elements that are not currently being read aloud by the screen reader application. This is a technical problem with prior systems and methods as the old accessibility frames are limited to a rectangular shape, so when a text of an accessibility element spans more than one line and does not begin at the beginning of a line and/or end at the end of a line, the old accessibility frame will enclose more than the text that is read aloud. Thus, the screen reader application will highlight a portion of the screen according to the old accessibility frame, which will be over-inclusive of text that is not currently being read by the screen reader application. As discussed herein, this asynchronization of voice-over and screen highlights creates a non-user-friendly user interface that causes challenges and confusion for certain users and/or in certain conditions or environments.

Figure 2C:
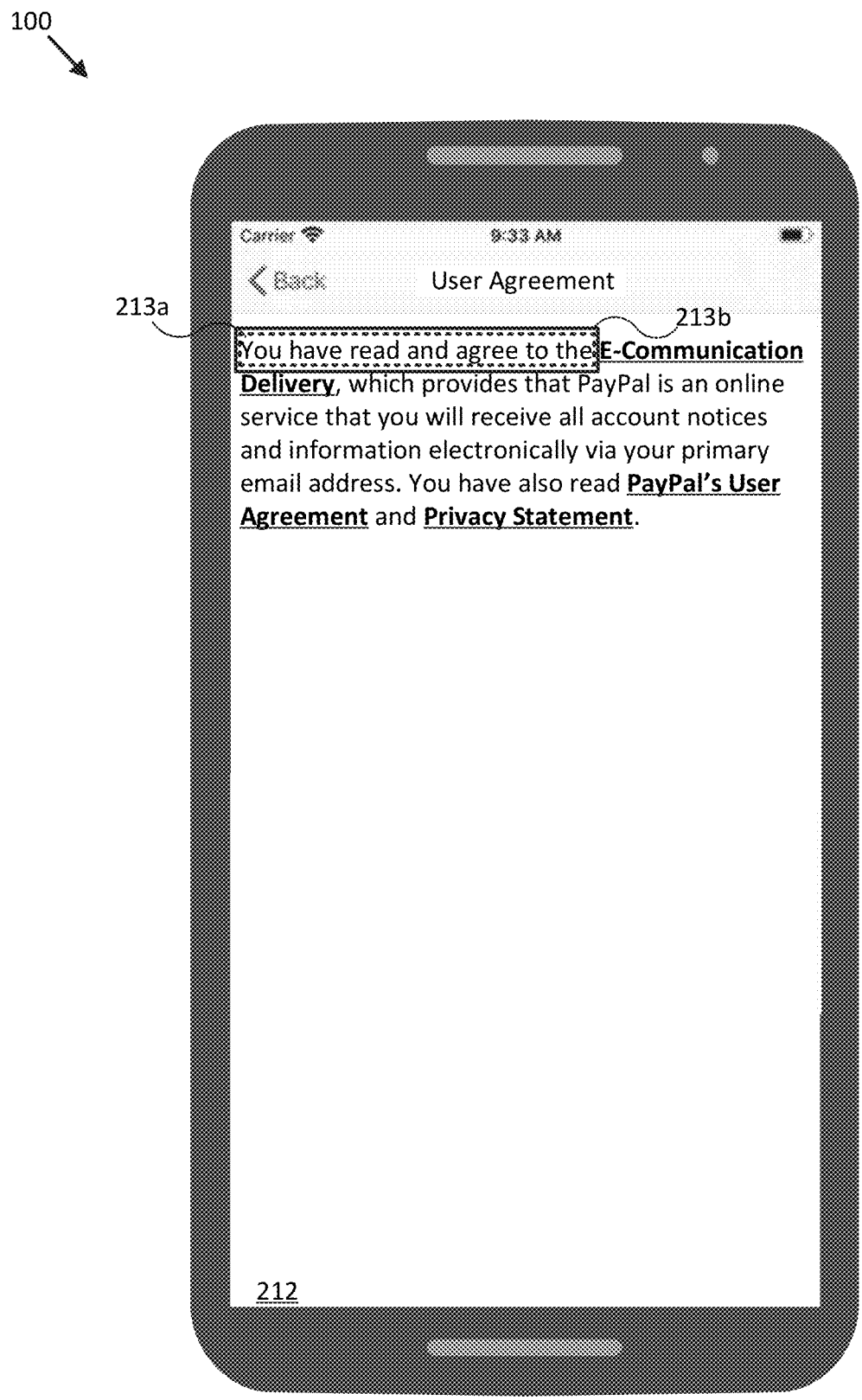
FIGS. 2C-2H illustrate old accessibility frames prior to being replaced with new accessibility frames in which screen highlights are synchronized with text that is audibly read by a screen reader application in accordance with one or more embodiments of the present disclosure.
Figure 2D:
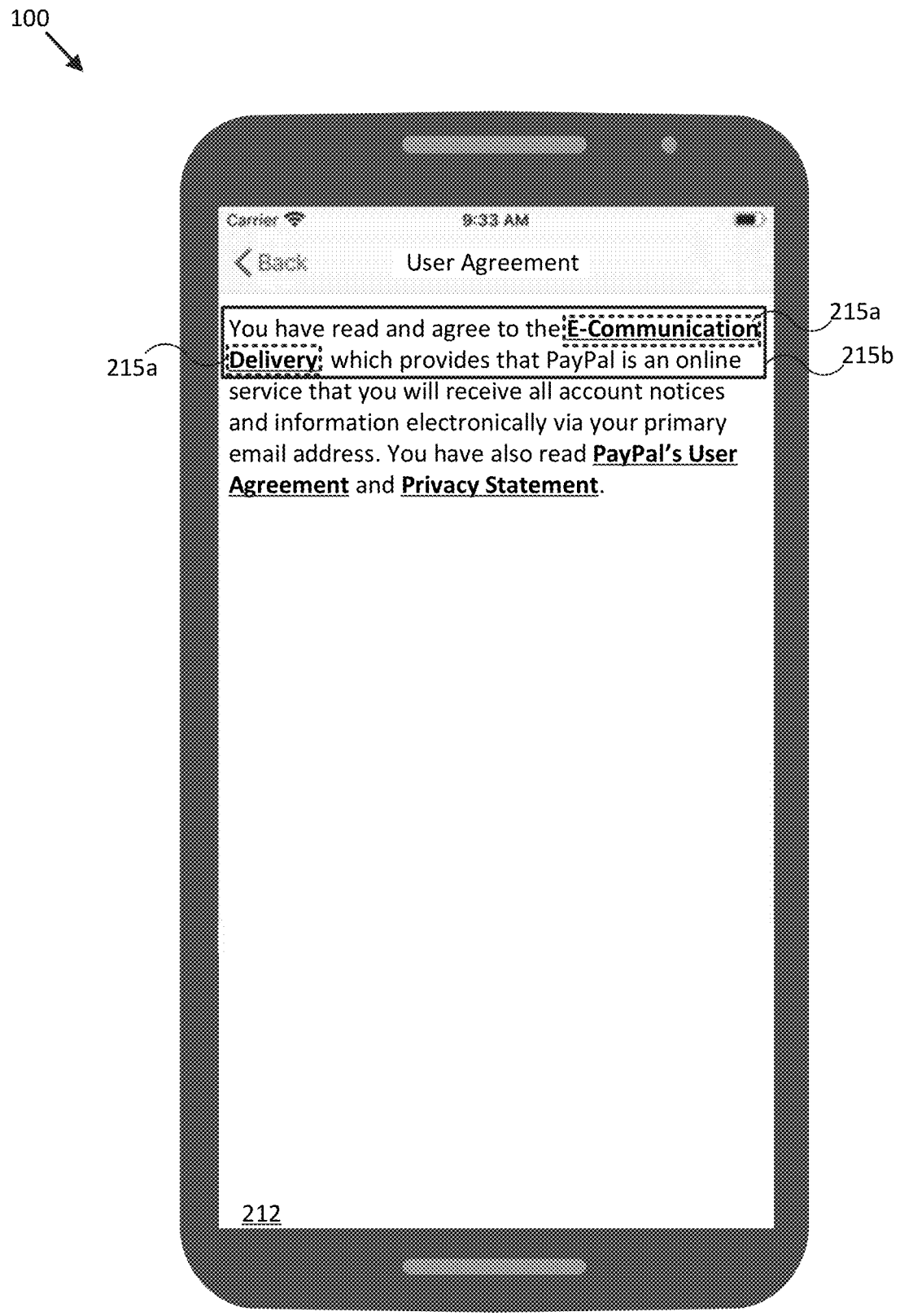
Figure 2E:
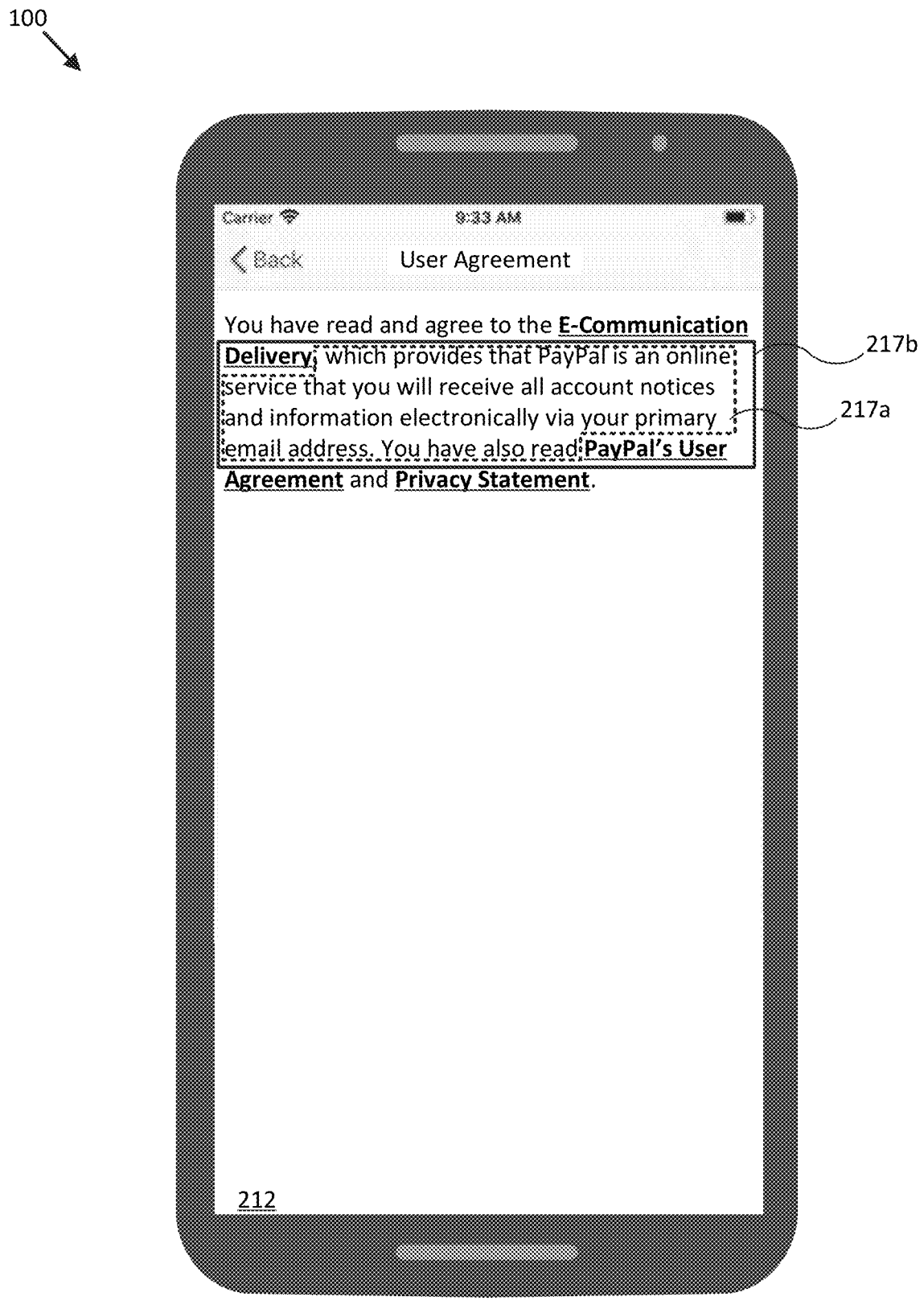
Figure 2F:
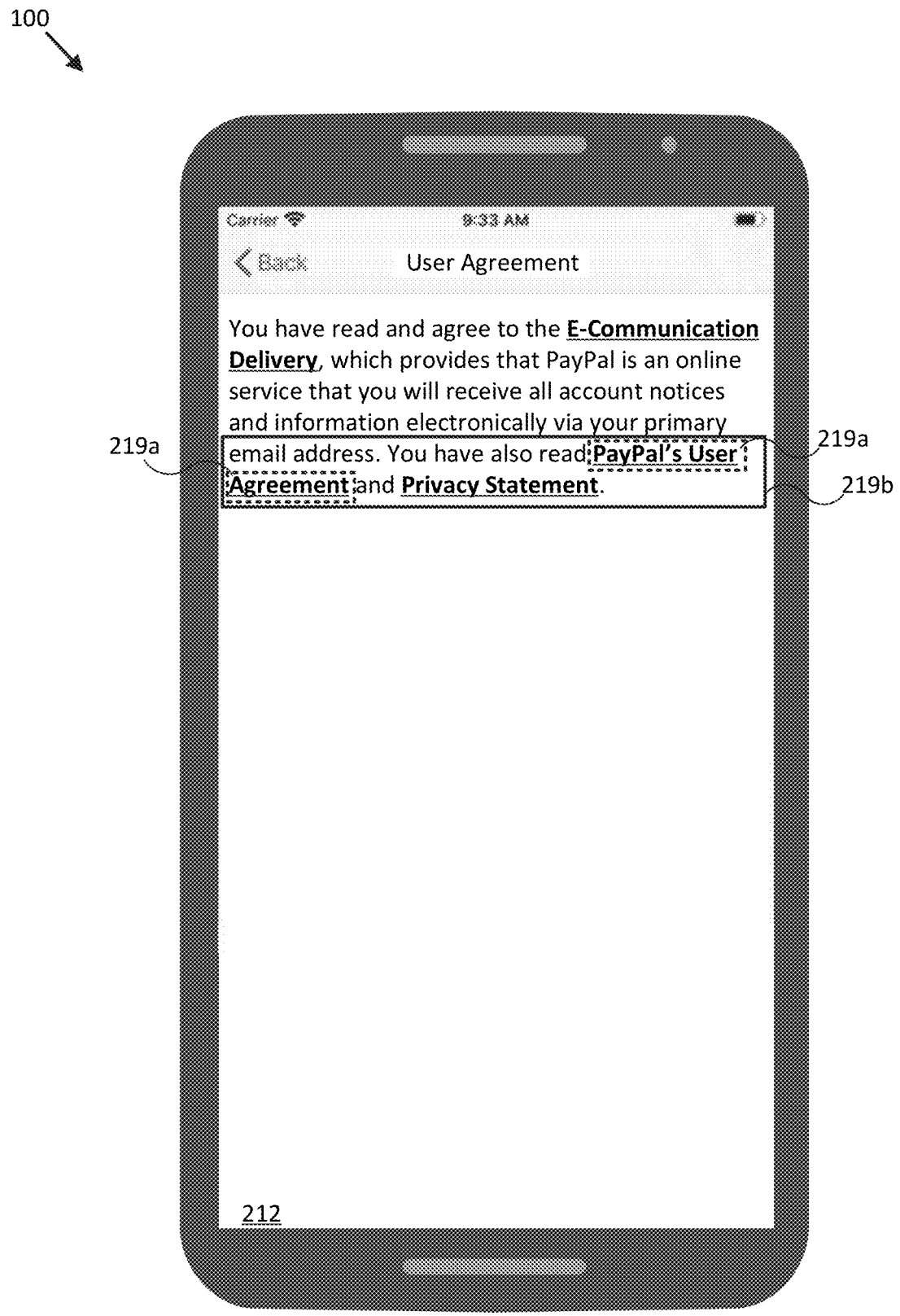
Figure 2G:
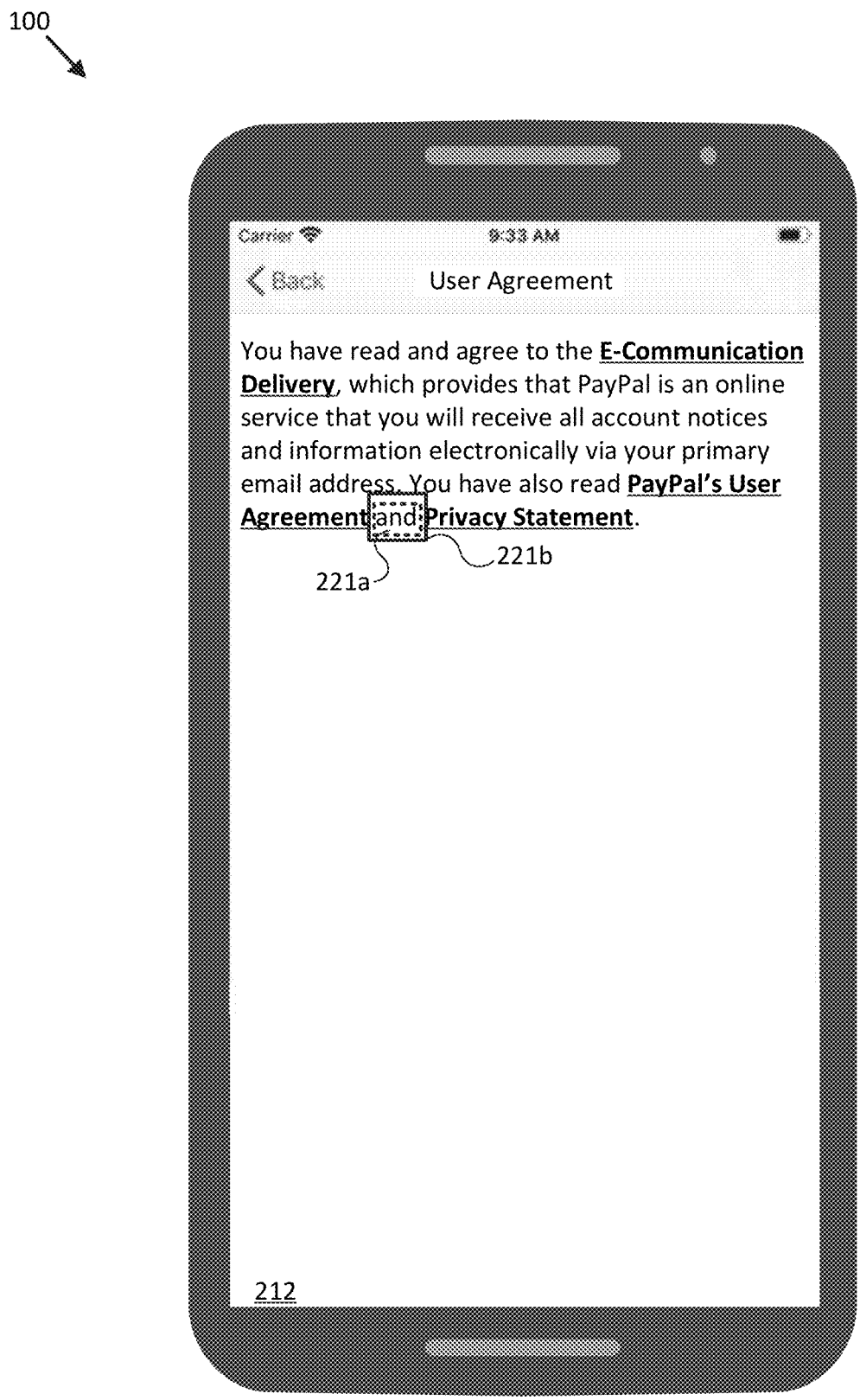
Figure 2H:
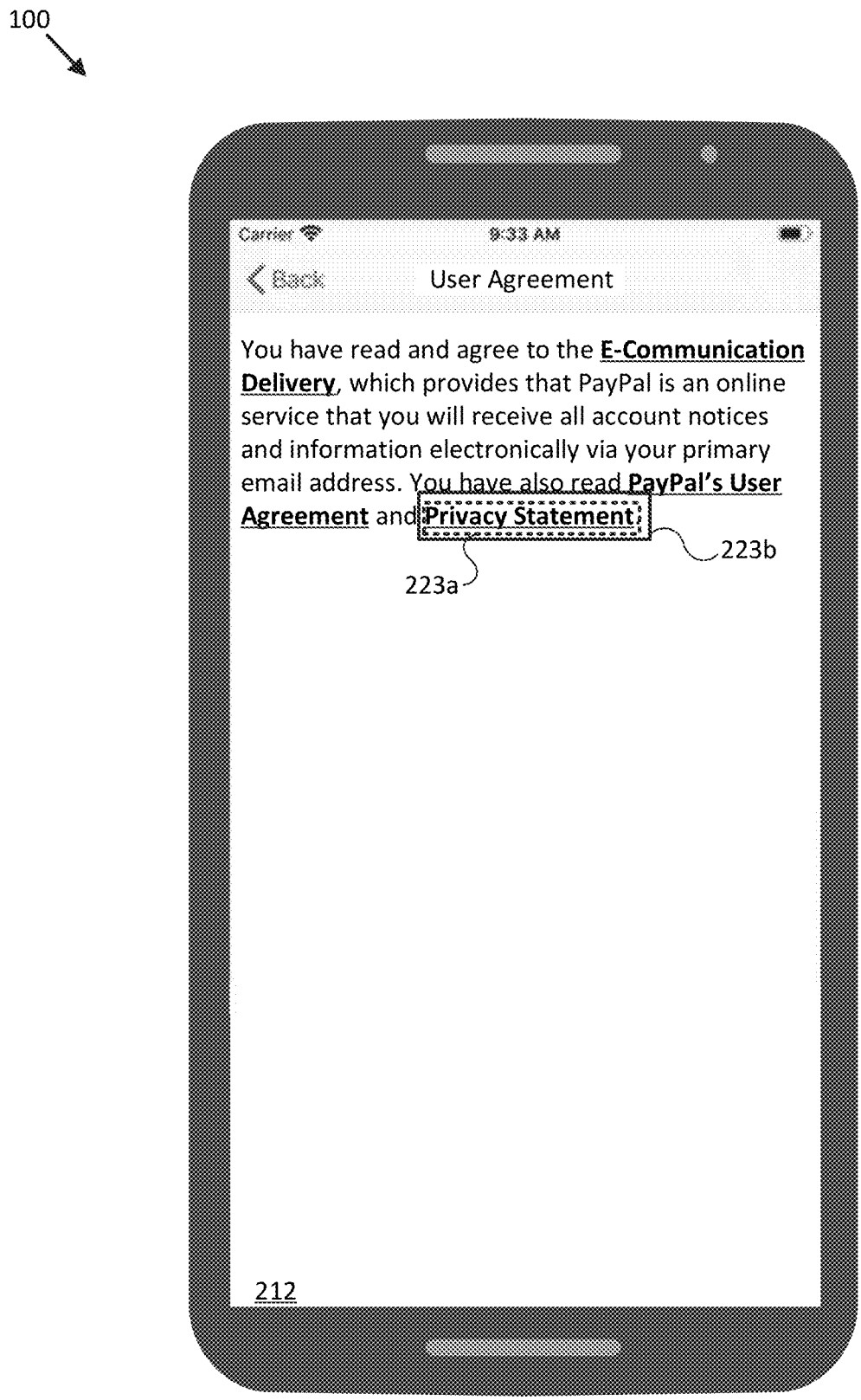

By contrast, since the accessibility elements 213a, 221a, and 223a of FIGS. 2C, 2G, and 2H have texts that are capturable with a rectangular shape, the old accessibility frames 213b, 221b, and 223b are synchronized with the text that is read aloud by the screen reader application. However, having screen highlights that are sometimes correctly inclusive of text read aloud and other times incorrectly over-inclusive of text read aloud may lead to even more confusion for the user.

The process 200 provides a technical solution to the above identified technical problem by synchronizing screen highlights and all of the texts of the accessibility elements that are read aloud by the screen reader application.

Referring back to FIG. 2A, the process 200 continues at block 206. At block 206, the system may determine one or more frames that captures the plain text or the hyperlink of the accessibility element.

Figure 2I:
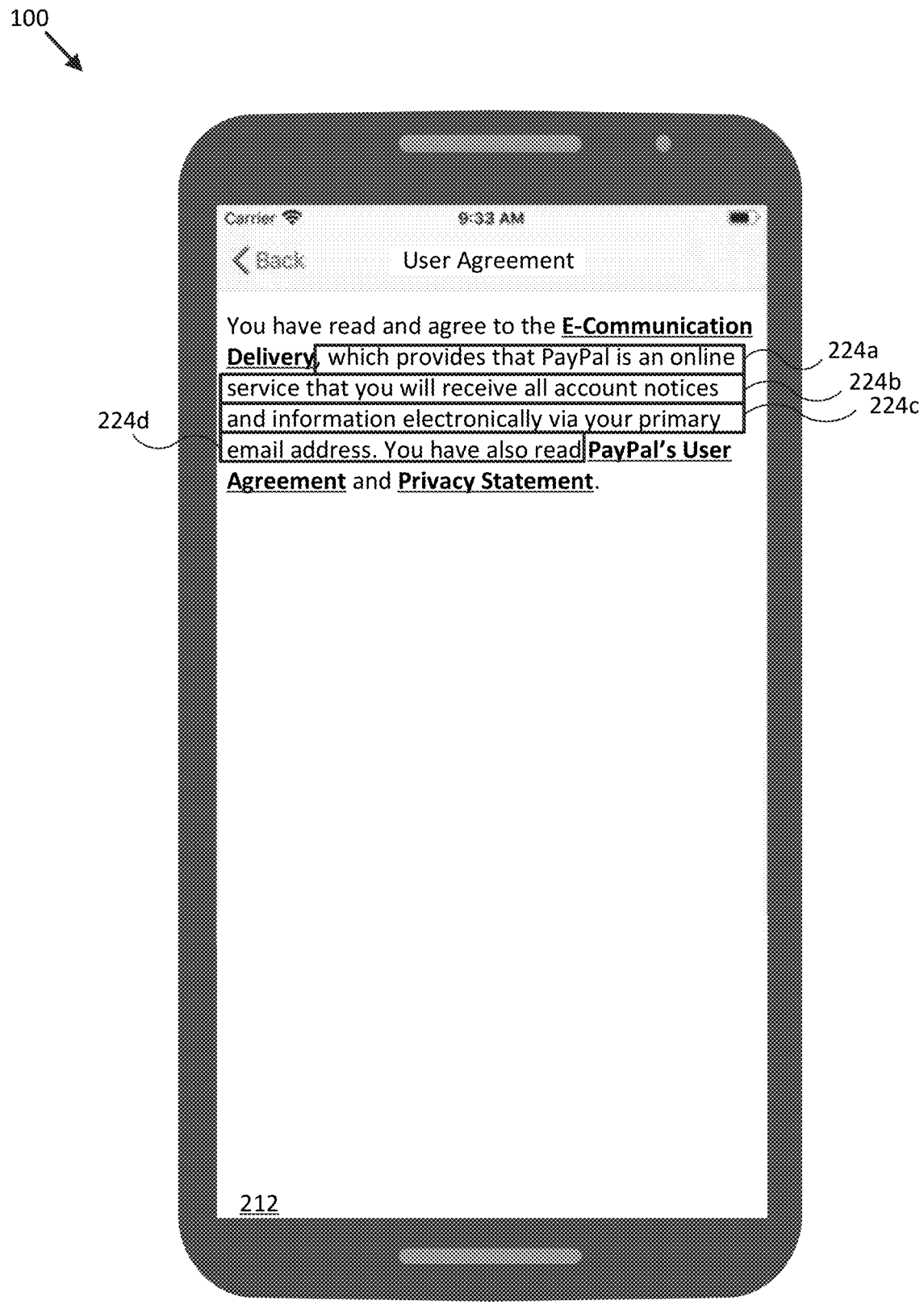
FIG. 2I illustrates frames that capture text of an accessibility element and that are combined in generating a new accessibility frame for the accessibility element to synchronize a screen highlight with the text that is read by a screen reader application in accordance with one or more embodiments of the present disclosure.

To determine the one or more frames that captures the plain text or hyperlink of the accessibility element, the system may determine pixel coordinates that define a boundary that captures a string of text for the plain text or the hyperlink at each line. For example, the system may determine where the text begins and where the text ends. Based on where the text begins and where the text ends, the system may determine the frames that capture the strings of the text at each line over which the text spans. The system may calculate a frame for each line defined by pixel coordinates for the screen 212. For example, the pixel coordinates may define each corner of the frame for each line. For illustration purposes, FIG. 2I shows frames 224a-d, which are calculated for the plain text of accessibility element 217a of FIG. 2E.

Referring back to the process 200 of FIG. 2A, at block 208, the system may convert the one or more frames into a new accessibility frame. For example, the system may convert the one or more frames into a new accessibility frame by combining the one or more frames and creating a path along an outer perimeter of the combined one or more frames such that the path forms a polygon shape that encloses the text that is audibly read by the screen reader application without including text from other accessibility elements. The path that forms the polygon shape may be assigned to the new accessibility frame. To illustrate, the frames 224a-d of FIG. 2I may be combined and a path 226, as shown FIG. 2J, that is drawn along the outer perimeter of the combined frames 224a-d may form a polygon shape that encloses the text of accessibility element 217a of FIG. 2E. The path 226 may be formed based on the pixel coordinates that made up the frames 224a-d. For example, a subset of pixel coordinates defining the outer perimeter of the frames 224a-d may define the path 226.

Figure 2J:
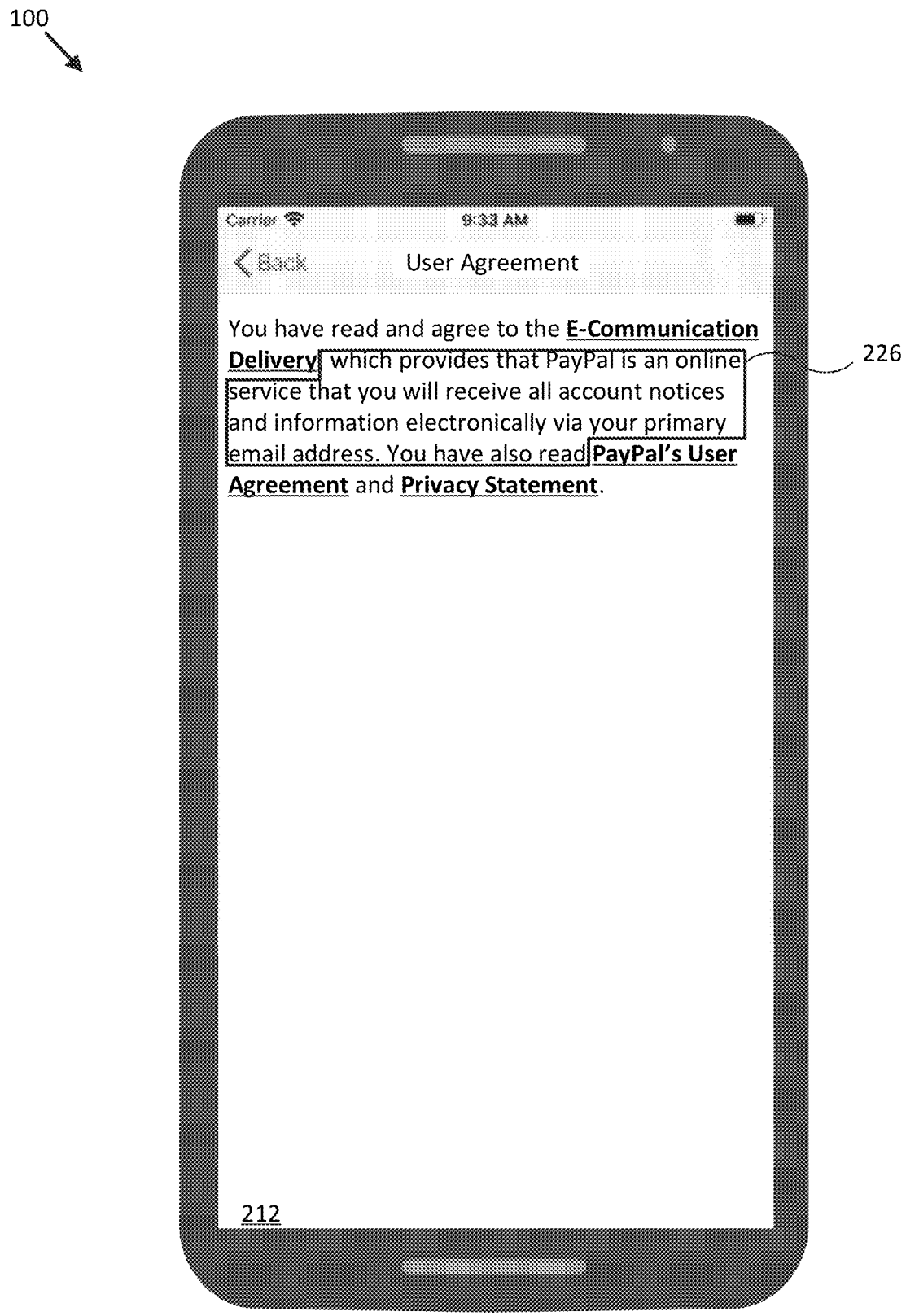
FIG. 2J illustrates a path formed from the combination of frames of FIG. 2I where the screen highlight is generated based on the path in accordance with one or more embodiments of the present disclosure.

The technical challenge with prior systems and methods was that screen highlights were limited to rectangular shapes, which did not allow for accuracy in highlighting exactly what was audibly read by a screen reader application. As shown in the example of FIG. 2J, the present disclosure allows for the polygon shape formed by the path 226 to have eight sides to accurately enclose the text of accessibility element 217. It will be appreciated that the polygon shape can be any two-dimensional shape formed with straight lines, however this does not necessarily mean that the screen reader application must use the polygon shape for screen highlighting as the screen reader application may use different focus area techniques for screen highlighting such as magnification, underlining, bubble drawing, curved or squiggly lines, bolding and darkening, and so forth.

Referring back to the process 200 of FIG. 2A, at block 210, the system may replace the old accessibility frame of the accessibility element with the new accessibility frame. The operations at blocks 206, 208, and 210 may be repeated for each accessibility element in the text container 211 such that each accessibility element may have its old accessibility frame replaced with a new accessibility frame. Thus, the screen reader application may take the updated accessibility elements with the new accessibility frames and audibly read the text of each accessibility element and highlight the portion of the screen defined by the new accessibility frame of the accessibility element such that the text read aloud is synchronized with the portion of the screen that is highlighted.

FIGS. 3A-3F illustrate screen highlights 302b, 304b, 306b, 308b, 310b, and 312b which have been synchronized with texts 302a, 304a, 306a, 308a, 310a, and 312a of accessibility elements 213a, 215a, 217a, 219a, 221a, and 223a that are read aloud by a screen reader application in accordance with one or more embodiments of the present disclosure. For example, the screen highlights 302b, 304b, 306b, 308b, 310b, and 312b and texts 302a, 304a, 306a, 308a, 310a, and 312a that are read aloud may have been synchronized by performing the process 200 of FIG. 2A.

Figure 3A:
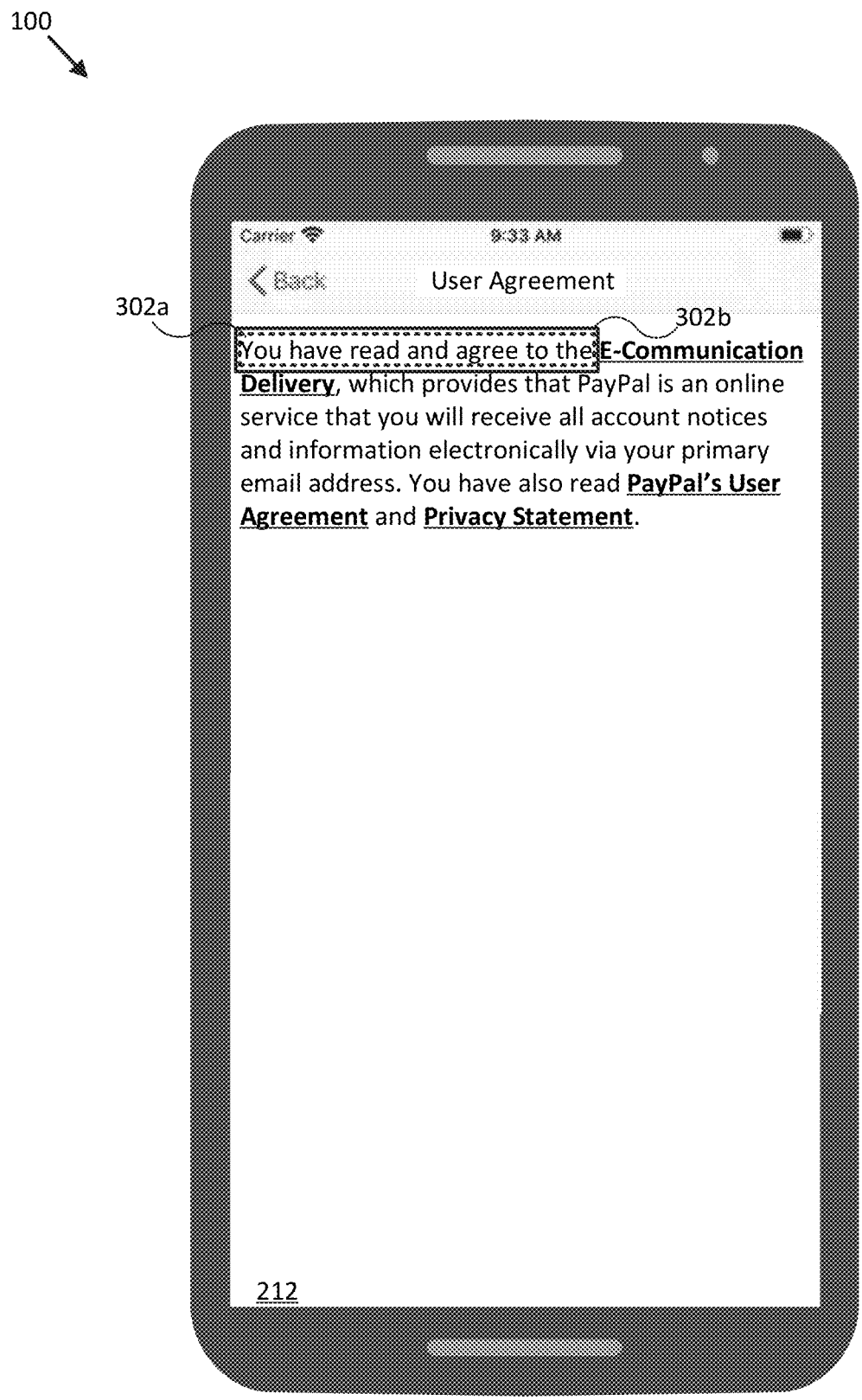
FIGS. 3A-3F illustrate screen highlights that have been synchronized with texts of accessibility elements in accordance with one or more embodiments of the present disclosure.

FIG. 3A illustrates screen highlight 302b which provides for an onscreen highlight of the plain text 302a: "You have read and agree to the", which is read aloud by the screen reader application.

Figure 3B:
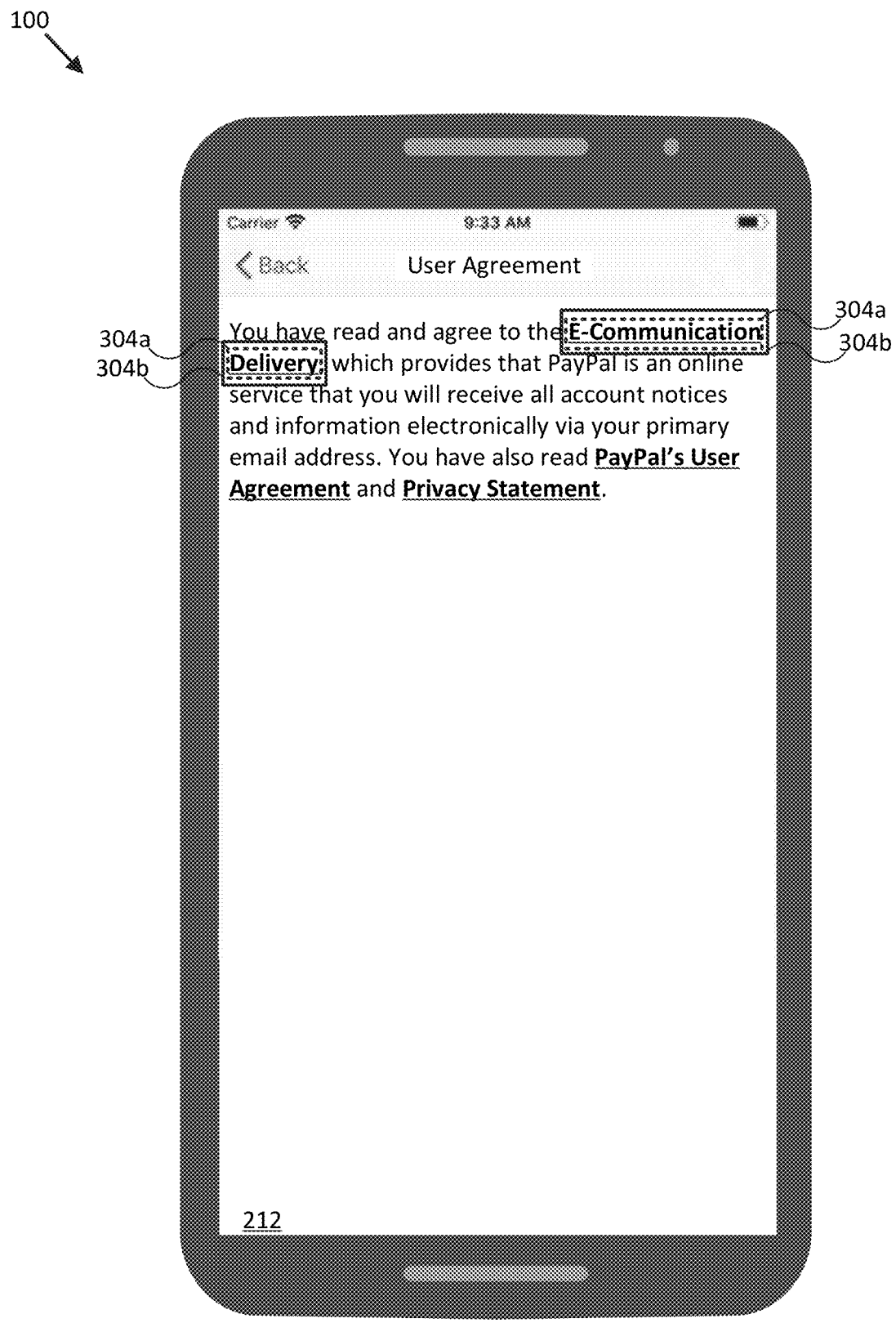

FIG. 3B illustrates a screen highlight 304b, which provides for an onscreen highlight of the clickable hyperlink 304a: "E-Communication Delivery", which is read aloud by the screen reader application along with instructions for a user to click/tap the hyperlink to be directed to a new screen corresponding to the hyperlink.

Figure 3C:
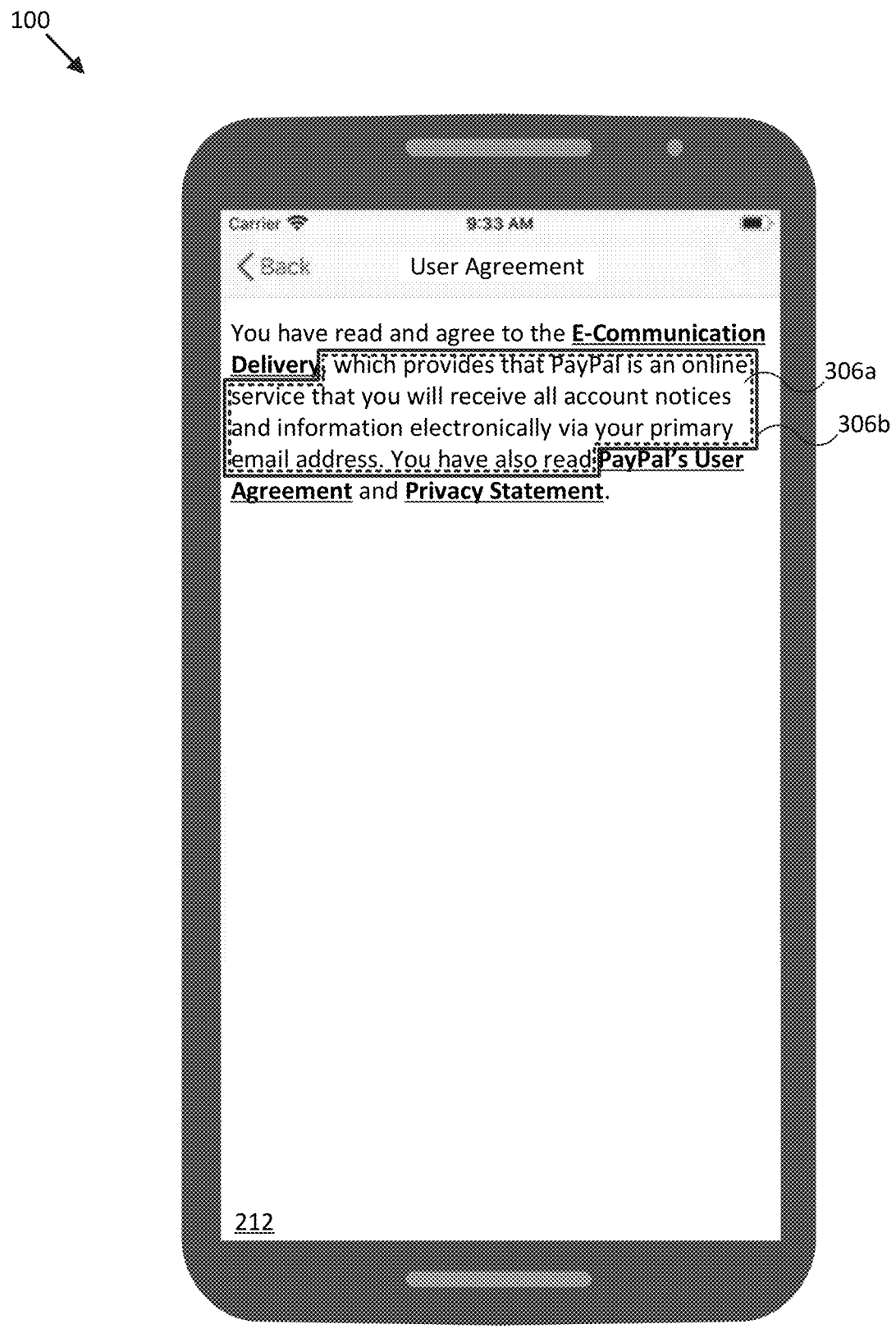

FIG. 3C illustrates screen highlight 306b which provides for an onscreen highlight of the plain text 306a: ", which provides that PayPal is an online service that you will receive all account notices and information electronically via your primary email address. You have also read", which is read aloud by the screen reader application.

Figure 3D:
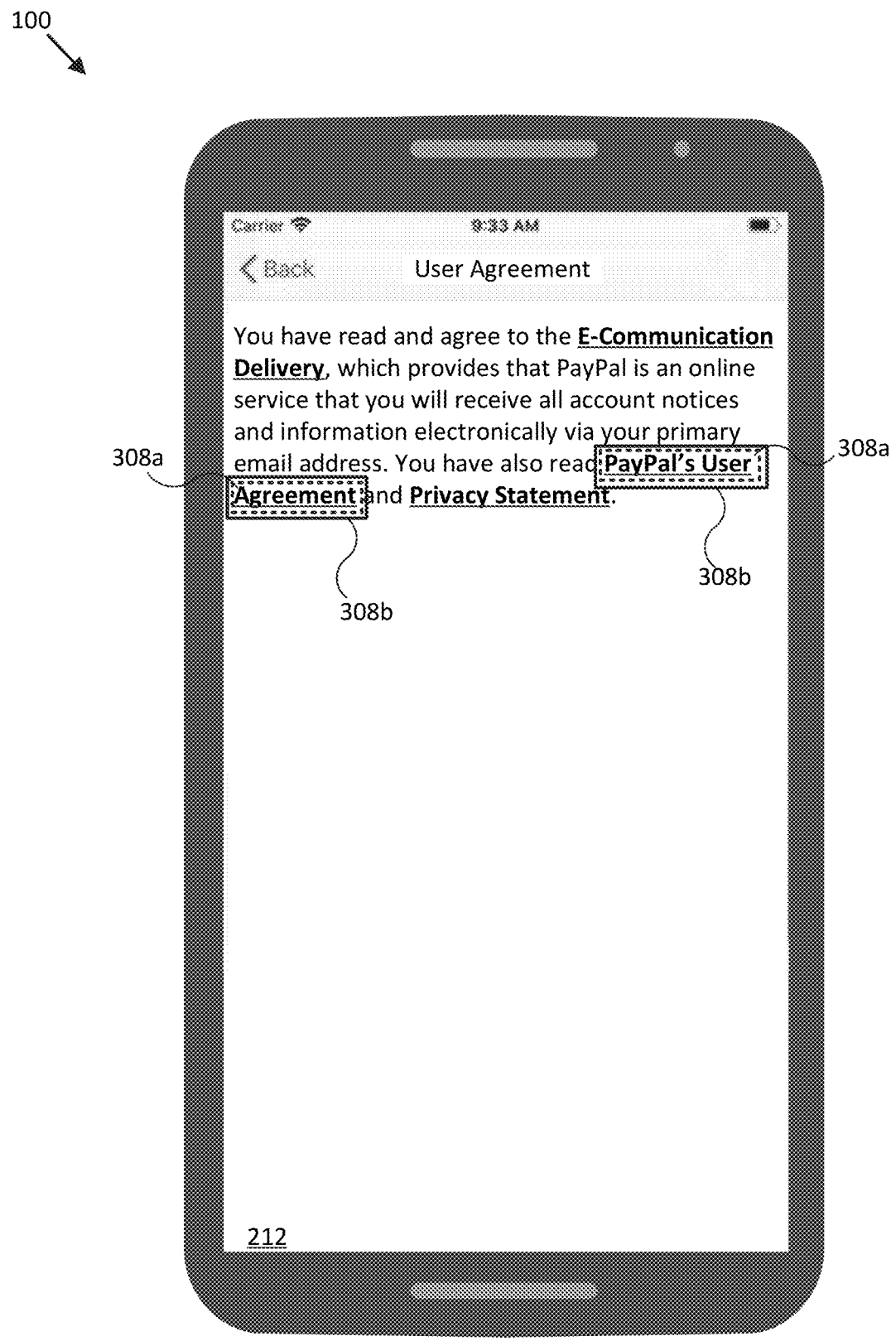

FIG. 3D illustrates a screen highlight 308b, which provides for an onscreen highlight of the clickable hyperlink 308a: "PayPal's User Agreement", which is read aloud by the screen reader application along with instructions for a user to click/tap the hyperlink to be directed to a new screen corresponding to the hyperlink.

Figure 3E:
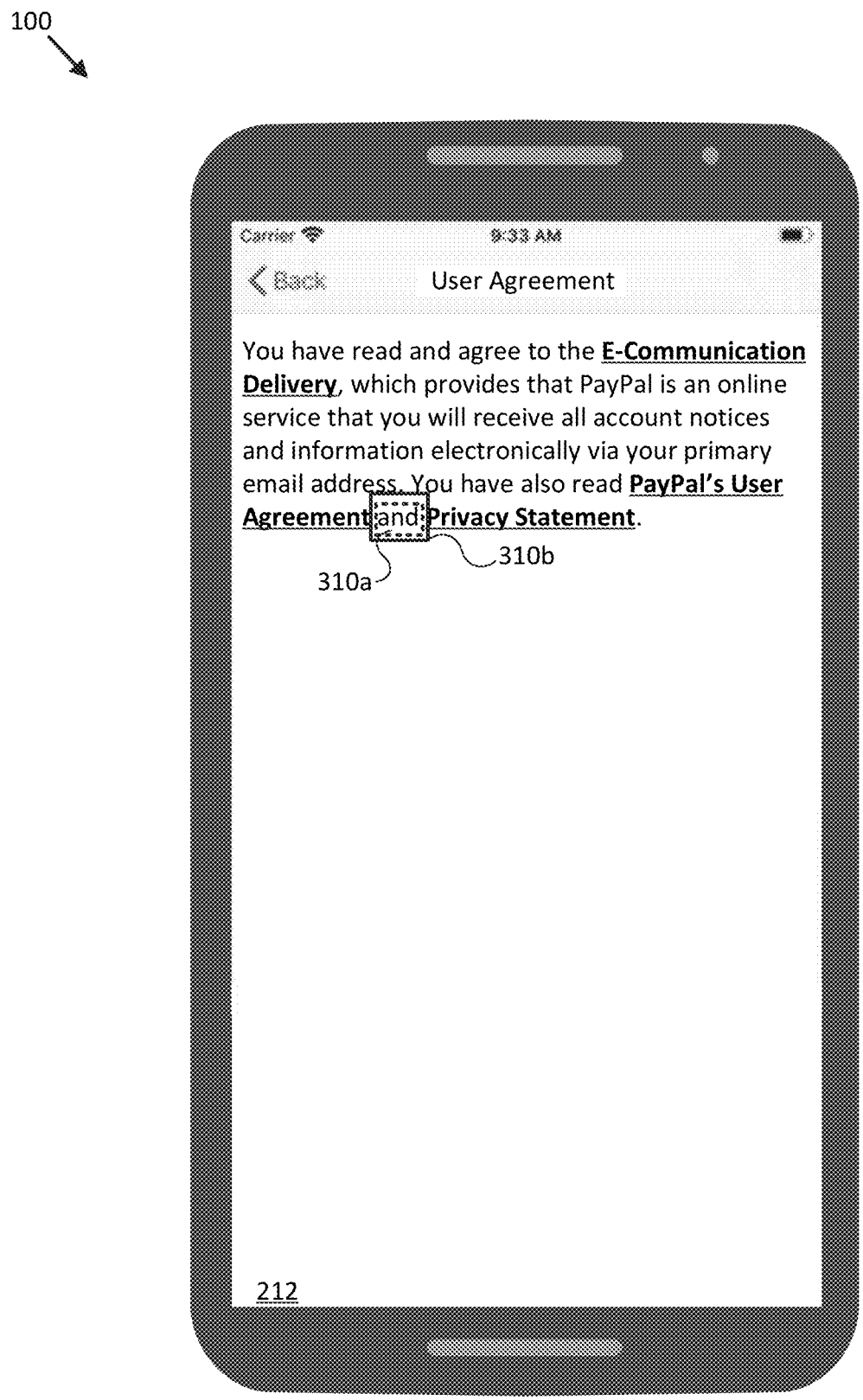

FIG. 3E illustrates screen highlight 310b which provides for an onscreen highlight of the plain text 310a: "and", which is read aloud by the screen reader application.

Figure 3F:
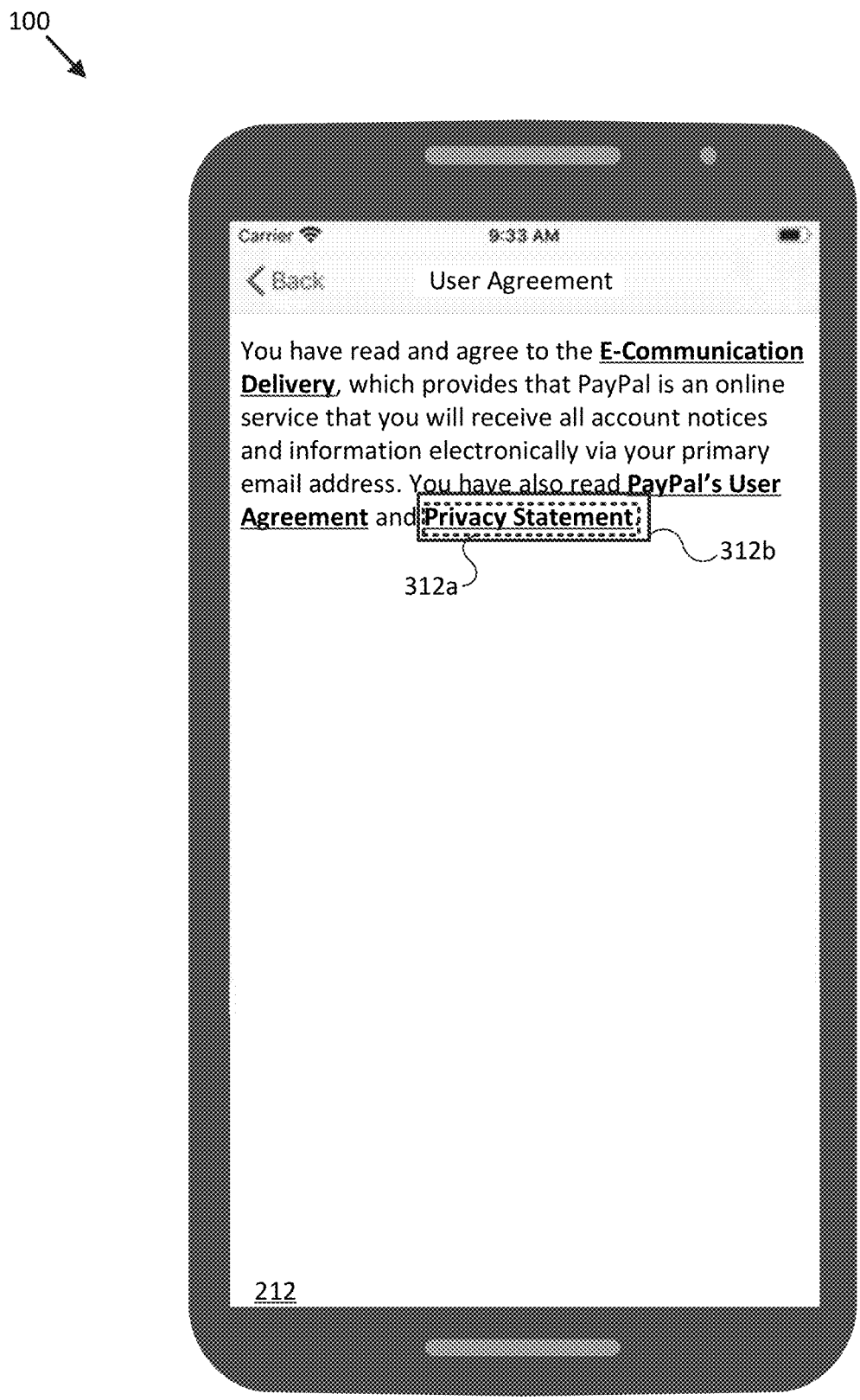

FIG. 3F illustrates a screen highlight 312b, which provides for an onscreen highlight of the clickable hyperlink 312a: "Privacy Statement", which is read aloud by the screen reader application along with instructions for a user to click/tap the hyperlink to be directed to a new screen corresponding to the hyperlink.

Figure 4:
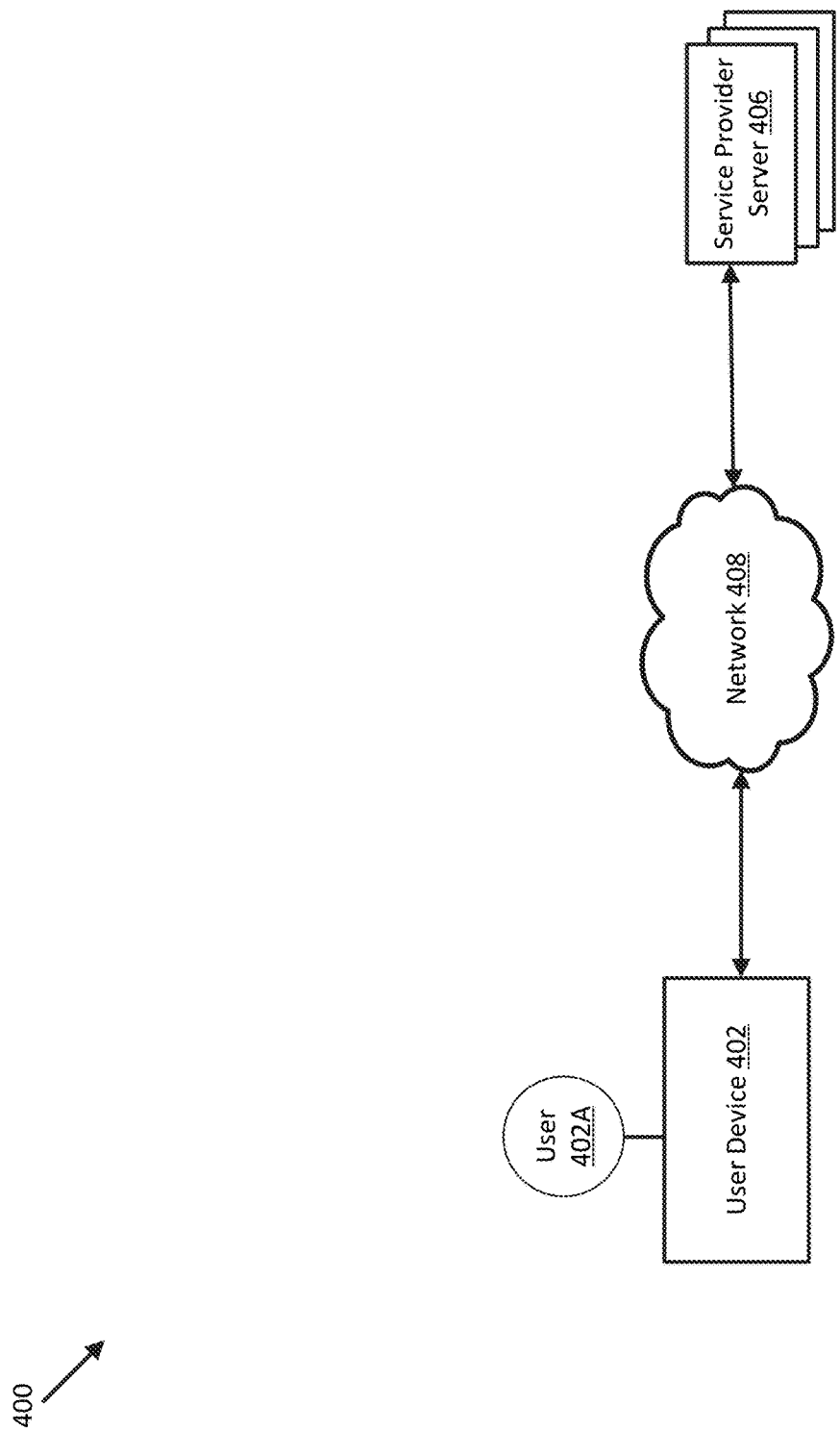
FIG. 4 illustrates a block diagram of a networked system suitable for implementing one or more embodiments of the present disclosure.

Referring now to FIG. 4, a block diagram of a networked system 400 configured to synchronize screen highlights and voice-over of screen reader applications in accordance with one or more embodiments of the present disclosure is illustrated. System 400 includes a user device 402, such as user device 100, and service provider server(s) 406. A user 402A is associated with user device 402, where user 402A can provide an input to service provider server 406 using user device 402.

User device 402 and service provider server 406 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 400, and/or accessible over a network 408 at each of the blocks of process 200 of FIG. 2A. Each of the memories may be non-transitory memory. Network 408 may be implemented as a single network or a combination of multiple networks. For example, in various embodiments, network 408 may include the Internet or one or more intranets, landline networks, and/or other appropriate types of networks.

User device 402 may be implemented using any appropriate hardware and software configured for wired and/or wireless communication over network 408. For example, in some embodiments, user device 402 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 402 may include one or more browser applications which may enable the user device 402 to provide voice-over capabilities by communicating with service provider server(s) 406 over network 408. For example, in one embodiment, the browser application may be implemented as a web browser configured to view information available over the internet and read aloud any information browsed on websites over the internet. User device 402 may also include one or more toolbar applications which may be used, for example, to provide client-side processing for performing desired tasks in response to operations selected by user 402A. In one embodiment, the toolbar application may display a user interface in connection with the browser application.

User device 402 may further include other applications as may be desired in particular embodiments to provide desired features to user device 402. For example, the other applications may include an application to interface between service provider server 406 and the network 408, security applications for implementing client-side security features, programming client applications for interfacing with appropriate application programming interfaces (APIs) over network 408, or other types of applications. In some cases, the APIs may correspond to service provider server 406. The applications may also include email, texting, voice, and instant messaging applications that allow user 402A to send and receive emails, calls, and texts through network 408, as well as applications that enable the user to communicate to service provider server 406 as discussed above. User device 402 includes one or more device identifiers which may be implemented, for example, as operating system registry entries, cookies associated with the browser application, identifiers associated with hardware of user device 402, or other appropriate identifiers, such as those used for user, payment, device, location, and or time authentication. In some embodiments, a device identifier may be used by service provider server 406 to associate user 402A with a particular account maintained by the service provider server 406. A communications application with associated interfaces facilitates communication between user device 402 and other components within system 400.

Service provider server 406 may be maintained, for example, by an online service provider which may provide screen highlight and voice-over synchronization services. In this regard, service provider server 406 includes one or more accessibility applications which may be configured to interact with user device 402 over network 408 to facilitate the synchronization services as discussed in the present disclosure. Service provider server 406 maintains a plurality of user accounts (e.g., stored in a user account database accessible by service provider server 406), each of which may include account information associated with individual users.

Figure 5:
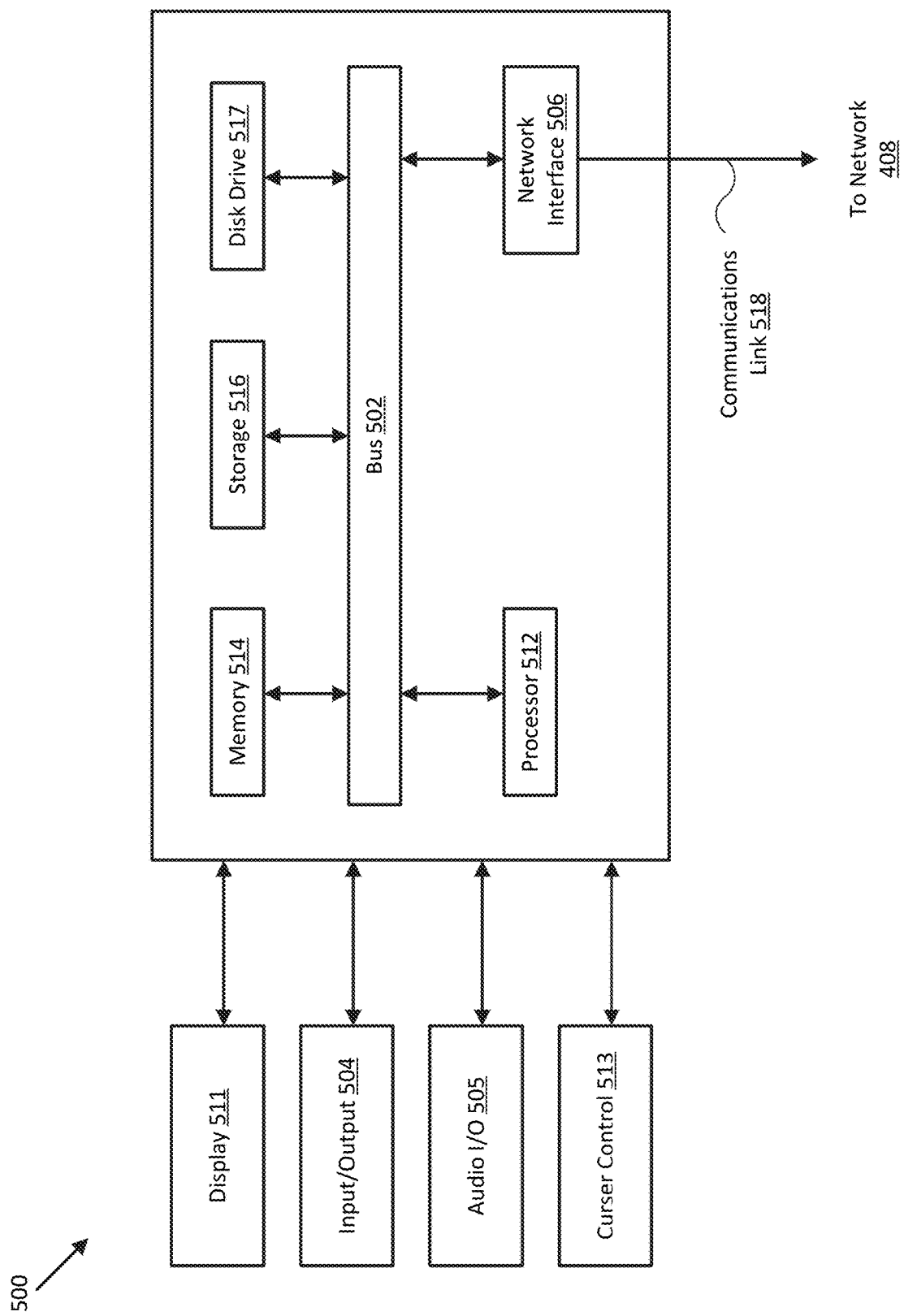
FIG. 5 illustrates a block diagram of a computer system in accordance with one or more embodiments of the present disclosure.

FIG. 5 illustrates a block diagram of a computer system 500 suitable for implementing one or more embodiments of the present disclosure, including user device 100 and/or a service provider device. In various implementations, the computer system 500 may comprise a personal computing device (e.g., a personal computer, laptop, smart phone, PDA, Bluetooth device, key FOB, badge, wearable device such as a smart watch, smart TV, or any other visual accessibility capable device) and/or a server computing device. It should be appreciated that each of the devices utilized by users and service providers discussed herein may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component, such as a display 511 and a cursor control 513 (such as a keyboard, keypad, mouse, etc.). I/O component 504 may further include NFC communication capabilities. An optional audio I/O component 505 may also be included to allow a user to use voice for inputting information by converting audio signals. Audio I/O component 505 may allow the user to hear audio such as audible descriptions provided by a screen reader application. A transceiver or network interface 506 transmits and receives signals between computer system 500 and other devices, such as another user device, an entity server, and/or a provider server via network 408. In one embodiment, the transmission is wireless, although other transmission mediums and methods may also be suitable. Processor 512, which may be one or more hardware processors, can be a micro-controller, digital signal processor (DSP), or other processing component, processes these various signals, such as for display on computer system 500 or transmission to other devices via a communication link 518. Processor 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor 512 and other components by executing one or more sequences of instructions contained in system memory component 514. Logic may be encoded in a computer-readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system, comprising:
a non-transitory memory; and
one or more hardware processors coupled to the non-transitory memory and configured to read instructions from the non-transitory memory to cause the system to perform operations comprising:
obtaining a text container queued to be audibly read by a screen reader application of a user device, the text container comprising plain text and one or more hyperlinks;
determining each accessibility element in the text container, wherein each of the accessibility elements comprises one or more old accessibility frames associated with a screen highlight of a plain text or a hyperlink of the accessibility element that causes a navigation to another application interface, and wherein the screen highlight indicates what is being audibly read by the screen reader application; and
for each of the accessibility elements:
determining one or more frames that captures the plain text or the hyperlink of the accessibility element independent of data associated with-another accessibility element;
determining an onscreen element property associated with the one or more frames that causes a display of the plain text or the hyperlink of the accessibility element, wherein the onscreen element property is associated with a visibility of the plain text or the hyperlink within one or more user interfaces;
generating audible instructions for the display of the onscreen element property for the one or more frames;
identifying a polygon shape corresponding to the one or more frames that captures the plain text or the hyperlink when being audibly read by the screen reader application;

creating, for the identified polygon shape, a path along a perimeter corresponding to a combination of the one or more frames:
converting the one or more frames into a new accessibility frame based on assigning the path to the new accessibility frame corresponding to the identified polygon shape that encloses the one or more frames; and
replacing the one or more old accessibility frames with the new accessibility frame, wherein the new accessibility frame further comprises the audible instructions for the onscreen element property when the screen highlight indicates what is being audibly read by the screen reader application.

2. The system of claim 1, wherein the determining the one or more frames that captures the plain text or the hyperlink of the accessibility element comprises:
determining pixel coordinates that define a boundary corresponding to the one or more polygon shapes that captures a string of text for the plain text or the hyperlink at each line; and
calculating a frame for each line based on the pixel coordinates.

3. The system of claim 2, wherein the converting the one or more frames into the new accessibility frame comprises creating a path based on the pixel coordinates.

4. The system of claim 1, wherein the determining each accessibility element in the text container comprises communicating with the screen reader application to acquire each accessibility element.

5. The system of claim 1, wherein for at least one accessibility element, the new accessibility frame comprises a polygon-shaped frame having at least five sides.

6. The system of claim 1, wherein the operations further comprise:
providing each accessibility element having the new accessibility frame to the screen reader application, wherein each accessibility element having the new accessibility frame allows the screen reader application to limit a highlight on a screen of the user device to the plain text or the hyperlink captured by the new accessibility frame and audibly read by the screen reader application.

7. The system of claim 1, wherein the new accessibility frame further comprises a focus area technique for screen highlighting corresponding to the path along the perimeter corresponding to the combination of the one or more frames.

8. A method comprising:
obtaining a text container queued to be audibly read by a screen reader application of a user device, the text container comprising plain text and one or more hyperlinks;
determining each accessibility element in the text container, wherein each of the accessibility elements comprises one or more old accessibility frames associated with a screen highlight of a plain text or a hyperlink of the accessibility element, and wherein the screen highlight indicates what is being audibly read by the screen reader application; and
for each of the accessibility elements:
determining one or more frames that captures the plain text or the hyperlink of the accessibility element independent of data associated with another accessibility element;
determining an onscreen element property associated with the one or more frames that causes a display of the plain text or the hyperlink of the accessibility element, wherein the onscreen element property is associated with a visibility of the plain text or the hyperlink within one or more user interfaces;
generating audible instructions for the display of the onscreen element property for the one or more frames;
identifying a polygon shape corresponding to the one or more frames that captures the plain text or the hyperlink when being audibly read by the screen reader application;
creating, for the identified polygon shape, a path along a perimeter corresponding to a combination of the one or more frames;
converting the one or more frames into a new accessibility frame based on assigning the path to the new accessibility frame corresponding to the identified polygon shape that encloses the one or more frames; and
replacing the one or more old accessibility frame with the new accessibility frame, wherein the new accessibility frame further comprises the audible instructions for the onscreen element property when the screen highlight indicates what is being audibly read by the screen reader application.

9. The method of claim 8, wherein the determining the one or more frames that captures the plain text or the hyperlink of the accessibility element comprises:
determining pixel coordinates that define a boundary corresponding to the one or more polygon shapes that captures a string of text for the plain text or the hyperlink at each line; and
calculating a frame for each line based on the pixel coordinates.

10. The method of claim 9, wherein the converting the one or more frames into the new accessibility frame comprises creating a path based on the pixel coordinates.

11. The method of claim 8, wherein the determining each accessibility element in the text container comprises communicating with the screen reader application to acquire each accessibility element.

12. The method of claim 8, wherein for at least one accessibility element, the new accessibility frame comprises a polygon-shaped frame having at least five sides.

13. The method of claim 8, further comprising:
providing each accessibility element having the new accessibility frame to the screen reader application, wherein each accessibility element having the new accessibility frame allows the screen reader application to limit a highlight on a screen of the user device to the plain text or the hyperlink captured by the new accessibility frame and audibly read by the screen reader application.

14. The method of claim 8, wherein the new accessibility frame further comprises a focus area technique for screen highlighting corresponding to the path along the perimeter corresponding to the combination of the one or more frames.

15. A non-transitory machine-readable medium having stored thereon machine-readable instructions executable to cause a machine to perform operations comprising:
obtaining a text container queued to be audibly read by a screen reader application of a user device, the text container comprising plain text and one or more hyperlinks;
determining each accessibility element in the text container, wherein each of the accessibility elements comprises one or more old accessibility frames associated with a screen highlight of a plain text or a hyperlink of the accessibility element, and wherein the screen highlight indicates what is being audibly read by the screen reader application; and for each of the accessibility elements:
- determining one or more frames that captures the plain text or the hyperlink of the accessibility element independent of data associated with another accessibility element;
- determining an onscreen element property associated with the one or more frames that causes a display of the plain text or the hyperlink of the accessibility element, wherein the onscreen element property is associated with a visibility of the plain text or the hyperlink within one or more user interfaces;
- generating audible instructions for the display of the onscreen element property for the one or more frames;
- identifying a polygon shape corresponding to the one or more frames that captures the plain text or the hyperlink when being audibly read by the screen reader application;
- creating, for the identified polygon shape, a path along a perimeter corresponding to a combination of the one or more frames;
- converting the one or more frames into a new accessibility frame based on assigning the path to the new accessibility frame corresponding to the identified polygon shape that encloses the one or more frames; and
- replacing the one or more old accessibility frame with the new accessibility frame, wherein the new accessibility frame further comprises the audible instructions for the onscreen element property when the screen highlight indicates what is being audibly read by the screen reader application.

16. The non-transitory machine-readable medium of claim 15, wherein the determining the one or more frames that captures the plain text or the hyperlink of the accessibility element comprises:
- determining pixel coordinates that define a boundary corresponding to the one or more polygon shapes that captures a string of text for the plain text or the hyperlink at each line; and
- calculating a frame for each line based on the pixel coordinates.

17. The non-transitory machine-readable medium of claim 16, wherein the converting the one or more frames into the new accessibility frame comprises creating a path based on the pixel coordinates.

18. The non-transitory machine-readable medium of claim 15, wherein the determining each accessibility element in the text container comprises communicating with the screen reader application to acquire each accessibility element.

19. The non-transitory machine-readable medium of claim 15, wherein the operations further comprise:
- providing each accessibility element having the new accessibility frame to the screen reader application, wherein each accessibility element having the new accessibility frame allows the screen reader application to limit a highlight on a screen of the user device to the plain text or the hyperlink captured by the new accessibility frame and audibly read by the screen reader application.

20. The non-transitory machine-readable medium of claim 15, wherein the new accessibility frame further comprises a focus area technique for screen highlighting corresponding to the path along the perimeter corresponding to the combination of the one or more frames.

* * * * *